Sept. 8, 1931.  E. B. LEAR  1,822,100
AIR LINE OILER
Filed Feb. 21, 1930
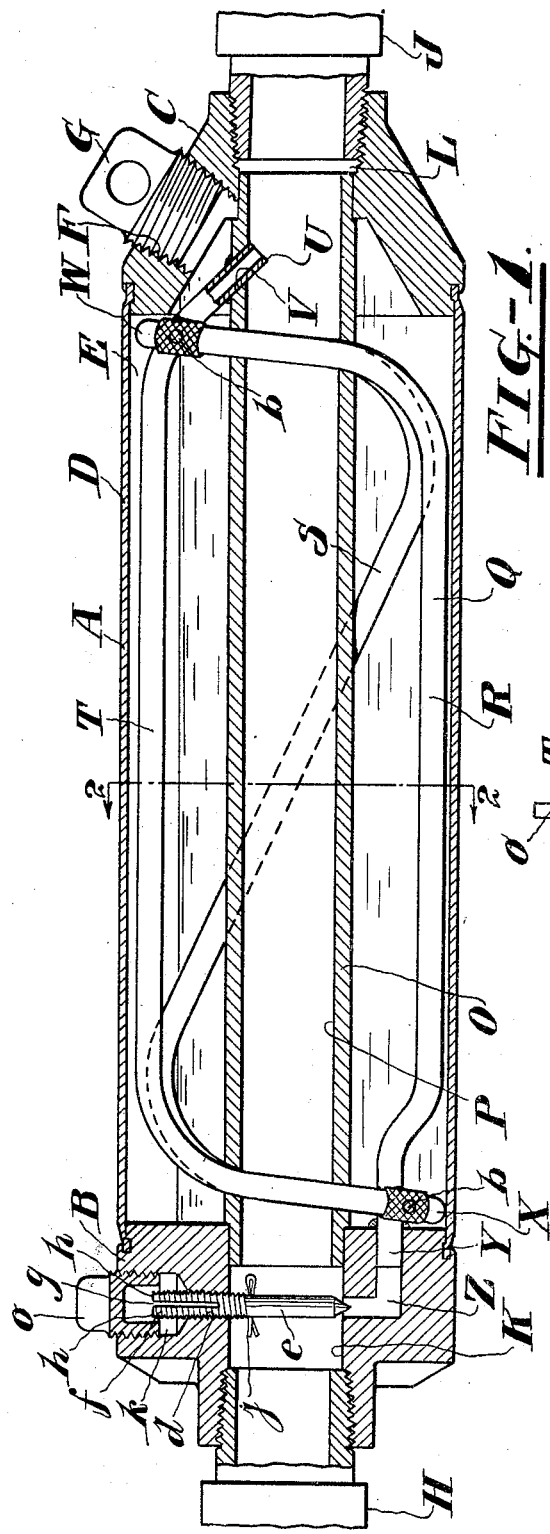
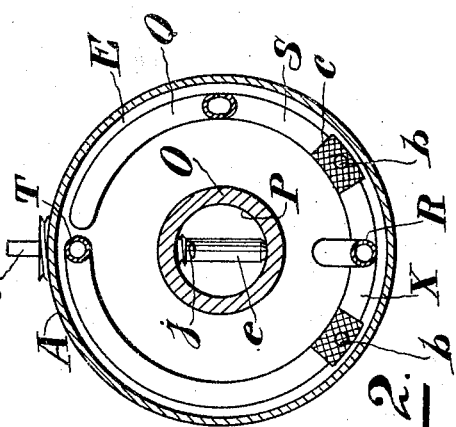
INVENTOR.
Earl B. Lear.
BY
HIS ATTORNEY.

Patented Sept. 8, 1931

1,822,100

UNITED STATES PATENT OFFICE

EARL B. LEAR, OF PHILLIPSBURG, NEW JERSEY, ASSIGNOR TO INGERSOLL-RAND COMPANY, OF JERSEY CITY, NEW JERSEY, A CORPORATION OF NEW JERSEY

AIR LINE OILER

Application filed February 21, 1930. Serial No. 430,344.

This invention relates to oiling devices, but more particularly to an air line oiler adapted to be attached to a pressure fluid supply line, such as those used for conveying pressure fluid to rock drills and other devices operated by pressure fluid and in which the pressure fluid has access to substantially all the relatively movable surfaces of such devices.

The objects of the invention are to assure lubricant in proper quantities and in a suitable state of atomization to the tool intended to be lubricated and to prevent clogging of the ports and passages in the lubricator.

Other objects will be in part obvious and in part pointed out hereinafter.

In the accompanying drawings illustrating the invention and in which similar reference characters refer to similar parts, Figure 1 is a longitudinal sectional elevation of an oiler constructed in accordance with the practice of the invention, and Figure 2 is a transverse view taken through Figure 1 on the line 2—2 looking in the direction indicated by the arrows.

Referring to the drawings in which is illustrated an oiler designated by A and resembling in many respects the oiler disclosed in the application of Fred M. Slater, Serial No. 323,089 filed December 1, 1928. The oiler accordingly is in the form of a casing comprising a pair of heads B and C and an intermediate tubular portion D which may be secured at its ends to the heads B and C in any suitable and convenient manner.

The interior of the tube D forms a reservoir E for oil, and such oil may be introduced into the reservoir E through an aperture F in the head C and normally sealed by a plug G. To the heads B and C are connected sections H and J respectively of a hose line whereby pressure fluid may be conveyed from a source of supply to the machine intended to be actuated, as for instance, a rock drill (not shown).

Within the heads B and C are bores K and L which may be said to form continuations of the hose line, and seated in the inner ends of said bores are the ends of a tube or pipe O which extends through the reservoir and may be suitably clamped in fixed position between the heads B and C. The interior of the pipe O forms a passageway P through which pressure fluid may flow from one section of the hose line to the other.

As in the aforesaid application, the oiler A is provided with a tube Q disposed within the reservoir E for conveying pressure fluid into the reservoir and oil from the reservoir into the passageway P. The tube Q is bent to form a plurality of longitudinally extending portions, such as those designated by R, S and T, and one end U of the tube in this instance extends through an aperture V in the pipe O to communicate with the passageway P at a point adjacent the head C. The end U of the tube may extend part way into the passageway P so that a portion of the pressure fluid flowing through the said passageway will be deflected by the tube for supplying pressure fluid to the reservoir E.

In order to insure a constant supply of oil to the passageway P, the tube Q is provided with a pair of looped portions W and X. The looped portions partly encircle the pipe O and lie on opposite sides of the pipe and also closely adjacent the heads C and B respectively.

The opposite end Y of the tube Q is inserted in a passage Z in the head B so that the pressure fluid flowing through the tube and the oil entrained thereby will be discharged from the end Y into the passage Z whence such oil and pressure fluid may flow into the bore K in the head B.

In oilers of the type to which the present invention pertains, and which are unprovided with means for adjusting the flow of pressure fluid and oil from the passageway to the reservoir and vice versa, it is customary to restrict the flow of oil from the reservoir by means of the ports through which communication is afforded between the reservoir and the main fluid current. When so controlling the flow of oil only ports of very small area may be used. Otherwise the oil will flow freely into the tube and thence into the passageway with the result that the tool intended to be lubricated becomes flooded.

One serious objection to the use of small ports is that they readily become clogged with dirt and foreign matter which may be introduced into the reservoir either by the lubricant or by the pressure fluid.

The present invention contemplates providing the looped portions W and X of the tube Q with the large ports b arranged substantially at right angles with respect to each other so that no matter what position the oiler may assume at least one of said ports will lie above the oil level to admit pressure fluid into the reservoir and another port b will be submerged to assure the entrance of oil into the tube and thus also into the passageway P. As an additional precaution for preventing the passage of dirt through the ports b, either into or from the interior of the tube, suitable screens c may be fastened on the tube Q to overlie the ports b.

Suitable means are provided for controlling the amount of oil which may enter the passageway P from the tube Q. To this end the head B is provided with a threaded aperture d which may be arranged coaxially with the outlet opening of the passage Z and in the aperture d is disposed a needle valve e which extends through the bore K to control the outlet opening of the passage Z. The needle valve being threadedly connected to the head B is therefore adjustable so that the size of the outlet passage Z may be varied in accordance with immediate requirements.

In order to prevent unauthorized movement of the needle valve e the threaded portion f of the valve e is provided with a slot g which extends through the greater portion of the threaded end f, thus forming a pair of half sections h on the threaded end which may be suitably spread to set up therein a spring tension so that when the needle valve e is threaded into the aperture d said half sections will firmly grip the threads of the aperture d.

To the end that the needle valve may be prevented from being accidentally unscrewed from the threaded aperture d, a pin, as for instance a cotter pin j, is inserted through the needle valve e so that when the needle valve is threaded outwardly said pin j will engage the wall of the bore K thus preventing the needle valve from being unscrewed at a point where it might otherwise be forcibly ejected from the aperture d by the pressure fluid in the passageway P.

At the outer end of the threaded aperture d is an enlarged aperture k to permit of ready access to the needle valve e for adjusting it from the exterior of the oiler A. The aperture k may be threaded, if desired, to receive a plug o for preventing the admission of foreign matter into the threaded aperture d.

The following is a brief description of the operation: With the oiler A interposed in the hose line in such manner that the pressure fluid will flow from the section J to the section H, a portion of the pressure fluid flowing through the passageway P will enter the end U of the tube and will be by-passed through the tube into the passage Z. At the same time pressure fluid will enter the reservoir to act on the pressure of the oil therein. Thereafter, when the tool to which it is intended to supply lubricant is set in operation, pulsations are caused in the passageway P due to the admission and cut-off of pressure fluid in the tool. These pulsations are transmitted into the reservoir so that upon each pulsation, a slight amount of lubricant will be forced into the tube by the unbalanced pressures in the reservoir and the passageway. Such oil will be conveyed through the tube into the passage Z at which point it will be introduced into the pressure fluid flowing through the passageway P.

When using the oiler for only a single tool the needle valve e may be adjusted to a position to restrict the outlet opening of the passage Z so that lubricant in only sufficient quantities for the needs of a single tool may be provided to the pressure fluid flowing through the passageway P. However, when additional tools are connected to the hose line, the needle valve e may be opened to wider limits, thus permitting an increased amount of oil to flow from the passage Z into the passageway P to supply the needs of any number of tools which may be connected to the hose line.

Whenever the needle valve e is set in a position to supply lubricant to only one tool and in which position the outlet opening of the passage Z is greatly restricted, it is possible that dirt may accumulate at that point. Whenever this occurs the needle valve e may be opened to wide limits for a brief period and such dirt will then be immediately dislodged and conveyed through the passageway P by the pressure fluid flowing therethrough.

I claim:

1. In an air line oiler, the combination of a casing forming a reservoir for oil and means forming a passageway for pressure fluid through the casing, a passage in the casing and communicating at its ends with the passageway at points near the ends of the reservoir to by-pass a portion of pressure fluid through the passage from one point to another in the passageway, ports affording communication between the passage and the reservoir to convey oil into the passage and pressure fluid into the reservoir, and a value in the casing adjustable from the exterior of the casing and cooperating with one end of the passage to control the flow of pressure fluid and entrained oil from the passage into the passageway.

2. In an air line oiler, the combination of a casing forming a reservoir for oil and means forming a passageway for pressure fluid through the casing, a tube in the reservoir communicating at its ends with the passageway at points near the ends of the reservoir to by-pass a portion of pressure fluid from one point of the passageway to another, ports in the tube for conveying pressure fluid from the tube to the reservoir and oil from the reservoir into the tube, a threaded aperture in the casing and being axially aligned with one end of the tube, a needle valve adjustable in the aperture for controlling the outlet opening of the tube and being accessible for adjustment from the exterior of the casing, and means on the needle valve to limit the retractive movement of the needle valve.

In testimony whereof I have signed this specification.

EARL B. LEAR.